July 22, 1969   H. J. ELLIOTT   3,457,335
PELLETISATION OF FUSIBLE SUBSTANCES
Filed July 20, 1966
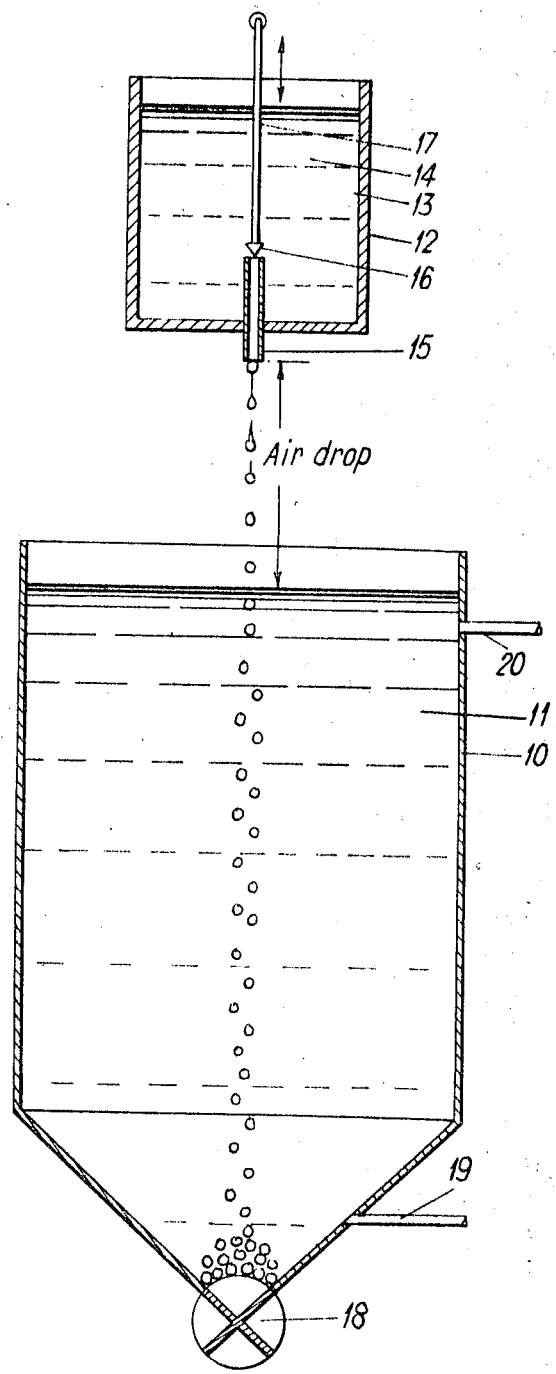

United States Patent Office 3,457,335
Patented July 22, 1969

3,457,335
PELLETISATION OF FUSIBLE SUBSTANCES
Herbert James Elliott, The Bungalow, Budbury,
Bradford-on-Avon, Wiltshire, England
Filed July 20, 1966, Ser. No. 566,604
Claims priority, application Great Britain, July 21, 1965,
31,126/65
Int. Cl. B22d *23/08;* B29c *23/00*
U.S. Cl. 264—13        7 Claims

ABSTRACT OF THE DISCLOSURE

A pelletising method for pitch and resin substances is provided in which an intermittent or pulsating flow of the molten substance to be pelletised is released vertically downward from the nozzle of a drop-forming head having a reciprocating flow-control plunger, the intermittent downward flow so released forming itself during free air fall into a succession of discrete droplets that enter a body of cooling water in a pelletising vessel where they solidify. The vertical air drop distance from the nozzle of the drop-forming head to the cooling water surface, and the temperature of the molten substance, are both somewhat critical. If the air drop distance is too short, the droplets, which first form with "tails," do not have time to retract the tail into the droplet body; and if the distance is too great the droplets or globules reach a speed in free fall that causes them to flatten or rupture upon impact with the water surface. If the temperature of the molten substance is too low, separate globules will not form but a thread-like formation issues from the nozzles; while if the temperature is too high, the globules are very fluid and flatten or disrupt upon impact with the cooling water.

---

This invention relates to the treatment of fusible materials such as pitch and resins in order to obtain these in the physical form of pellets.

In the handling and use of electrode pitch, and resins, e.g. cumarone resin, it is advantageous to have the substance available in pelletised form. A commercial process already exists for pelletising such materials; however, this process requires the use of a tall tower maintained at superatmospheric pressure and it will clearly be a material advance if the need for the tall pressurised tower can be avoided, providing that it can be done without introducing other complications. It is an object of the invention to achieve this.

According to the present invention, there is provided a pelletising process for fusible substances, such as pitch, wherein discrete globules of the substance in molten form are produced by free fall in air from a drop-forming head and enter a body of water or other cooling liquid (in which the substance is insoluble) at atmospheric pressure, in which they solidify.

Preferably, the globules are formed as a result of intermittent or pulsating flow of the molten substance through a nozzle of the drop-forming head under the control of a reciprocating plunger, and the vertical air drop distance from the nozzle exit to the cooling water surface is sufficiently great for each globule to become substantially spherical by retraction into the globule of any tail formed on it as it leaves the nozzle.

The temperature at which the molten substance is delivered by the drop-forming head should be maintained above that at which a thread-like formation issues from the nozzle instead of separate drops. On the other hand, it should be kept below the level at which the globules flatten significantly upon impact with the cooling water surface.

In the case of pitch, if the cooling water temperature is substantially ambient atmospheric temperature hard almost spherical pellets can be formed by the technique according to the invention with only a short fall in the cooling water body. A very great saving in capital and running costs of plant is thereby achieved as compared with prior processes involving a tall pressurised tower. Also the moisture content of the dried pellets is considerably lower, i.e. 0.1% by weight or less, than was hitherto obtainable.

It has been found that in certain instances the temperature of the cooling water can, in fact, be raised above that at which the pellets normally would bond together, by dispersing in the water an anti-bonding additive such as a dimethyl silicone fluid or other chemically inert silicone. This reduces the drying needed on removal of the pellets since they are leaving the pelletising vessel at a higher temperature.

In what follows, the emphasis is on pelletising pitch but it will be understood that similar techniques are applicable to other fusible substances e.g. resins waxes and many more it being always a requirement that the cooling liquid be one in which the substance to be pelletised is insoluble.

One form of apparatus for carrying the invention into effect will now be described by way of example with reference to the accompanying diagrammatic drawing.

The drawing shows a vessel 10 containing cold water 11 at atmospheric pressure into which discrete globules of pitch are dropped from a dropping head 12. The dropping head 12 includes a reservoir tank 13 for molten pitch 14 which is equipped with thermostatically-controlled electric heaters to keep the pitch at a steady temperature. A vertical nozzle tube 15 passes through the floor of the tank 13; it projects up within the tank above the floor but its upper end is well below the surface level of the liquid pitch. An obturating cone plunger 16 reciprocates vertically with a small stroke at the upper end of the nozzle tube 15 being driven by an electric motor (not shown) through an eccentric drive acting on a vertical stem 17 to the lower end of which the cone plunger 16 is attached.

When the cone 16 descends on to the upper end of the tube 15 flow of pitch into the tube is stopped. And when the cone rises pitch is able to flow down out of the tank 13 through the tube 15. The result is that the liquid pitch leaves the lower end of the tube 15 as a succession of more or less separate drops or globules. These drops fall into the body of cooling water 11 where they quickly solidify into hard pellets. These pellets collect at the bottom of the vessel 10 and can be removed through a trap 18. To maintain a reasonably constant temperature in the vessel 10 connections 19, 20 are provided for removing a proportion of the water 11 as it becomes warmer and replacing it with cold water.

The output of pitch pellets, by weight, depends upon the head and temperature of the liquid pitch in the reservoir tank, and the cone angle of the plunger. The speed of the plunger does not change substantially the weight of pitch pellets produced but it controls the size of the pellets; that is to say the size of the pellets decreases as the speed of reciprocation is increased. For each type of pitch, there is an optimum temperature range within which the liquid pitch in the reservoir tank should be maintained. Too high a temperature results in the droplets or globules of pitch tending to spread and flatten on hitting the surface of the cooling water, while if the temperature is too low the pitch leaving the nozzle tube takes up a thread-like formation instead of forming discrete globules.

The length of the air drop, that is to say the vertical distance from the nozzle tube exit to the cooling water surface; is also important. Each globule of pitch leaving the nozzle tends to draw behind it a comparatively long tail which may indeed join it to the next globule above.

But during fall in air, assuming the liquid pitch is within the correct temperature range, the tail is retracted into the body of the globule, and the aim is to allow sufficient air drop for the globules to have become more or less perfect discrete spheres by the time they reach the water surface. On the other hand, if the air drop is too great the speed reached by the globules in free fall becomes such that the impact as they hit the water surface causes them to flatten. It will be understood that the optimum air drop, to give spherical or nearly spherical pellets, depends on whether the liquid pitch temperature is high or low in the permissible range for the particular pitch being treated because at higher temperatures it takes a shorter distance for the globules to lose their tails and become spheres but the tendency to flatten is more marked.

If the cooling water temperature is atmospheric or thereabouts the pellets are hard after quite a short fall in the water, two feet being ample, and when they collect at the bottom of the vessel they show no tendency to squash or stick together. After removal and drying to drive off surface moisture the pellets have only a very small content of occluded water remaining, say 0.1%. The pellets are smooth and substantially free of perforations and are well suited to pneumatic handling techniques.

Typically, a briquetting pitch, which is a relatively soft grade of pitch, having a softening point (ring and ball method) at 80° C. was found to pelletise successfully when dropped at a temperature in excess of 135° C. into water at a temperature below 30° C. The useful range of air drop, with pellets averaging 0.1 gram each, was from 4 to 24 inches. This range decreases with increasing pellet size; e.g. with pellets of 0.15 gram the range is 5 to 16 inches and at 0.2 gram it has narrowed to 9 to 13 inches.

With a harder grade of pitch, i.e. an electrode binder pitch with a softening point (ring and ball) at 105° C., the molten pitch may be dropped at a temperature in excess of 165° C. into water below 50° C. The same ranges of air drop apply.

There now follows a table giving specific examples of the conditions observed and results obtained in the pelletising of a briquetting pitch and an electrode pitch.

| Pitch type | Briquetting-binder | | Electrode-binder | |
| --- | --- | --- | --- | --- |
| Pitch softening point, °C(R&B) | 85 | 85 | 105 | 105 |
| Pitch temp., °C | 148 | 142 | 170 | 174 |
| Pitch head, in | 4 | 4 | 4 | 4 |
| Plunger cone angle, deg | 25 | 25 | 25 | 40 |
| Plunger speed, strokes/min | 700 | 500 | 500 | 700 |
| Plunger stroke, in | 5/16 | 5/16 | 5/16 | 5/16 |
| Orifice diam., in | 13/64 | 13/64 | 13/64 | 13/64 |
| Air drop, in | 8–16 | 8–20 | 8–20 | 8–12 |
| Cooling water temperature, °C | | Ambient | | |
| Output, g./min | 84 | 70 | 71 | 135 |
| Average pellet weight, g | 0.12 | 0.14 | 0.14 | 0.19 |

While in the simple apparatus illustrated only one dropping head nozzle is shown, for the purpose of commercial production it is desirable to equip the pelletising vessel with a multiple nozzle dropping head. Since the solidifying globules descending in the cooling water tend to wander a little from the vertical, the dropping nozzles must be sufficiently spaced from one another to avoid the globules encountering one another before they have solidified. Or alternatively, the reciprocation of the various plungers may be arranged to be mutually out of phase so that the globules from different nozzles fall in a staggered manner.

In a commercial pelletising process, it is desirable to provide means to carry the pellets away continuously. For this purpose, a submerged conveyor may be employed within the vessel, for example an endless belt, which may, if desired, be given a surface coating of a silicone or other anti-stick compound. Alternatively, a launder can be used, that is to say the pelletising vessel itself is extended laterally to form a launder. This is of considerable advantage in cases where, as happens with some substances to be pelletised, the pellets, or some of them, have a tendency to float rather than sink. One advantageous commercial form comprises a wide launder divided into parallel sections by means of longitudinal barriers, each section being equipped with a multiple nozzle dropping head.

It will be appreciated that with higher cooling water temperatures, and consequently higher temperatures of the pellets on removal, the amount of drying needed will be less. In certain cases it is founded that the inclusion of a suitable additive, preferably a chemically inert dimethyl silicone fluid, in the cooling water inhibits sticking and promotes solidification of the pellets thereby enabling the working temperature in the vessel to be increased. The silicone fluid should be well dispersed in the water and may be added as a 5% solution in, say, benzene or toluene; only a very small quantity is needed. The aim will then be to work at the highest temperature at which bonding of the pellets does not occur, which may be determined for various substances by means of simple experiment.

There follows a table of the highest "non-bonding" temperatures for various substances, using dimethyl silicone fluid additives of various viscosities.

| Material | Pelletising in liquid phase, non-bond temp. limit °C. | Dimethyl silicone additive 5% solution |
| --- | --- | --- |
| (1) North Thames Gas Board medium soft pitch. | 53–54 | 10 c.cs. of 30,000 c/s. |
| (2) North Thames Gas Board hard pitch. | 66–68 | Do. |
| (3) Midland Tar Distillers Ltd. pro-pelleted pitch fines. | 60–65 | Do. |
| (4) Rutgers Werke Und Teer Verwertung Akt. Ges. Elektrode Pitch No. 284/75. | 69–70 | 10 c.cs. of 1,000 c/s. |
| (5) Electrode Pitch Bx No. 283/75 | 70–73 | 10 c.cs. of 5,000 c/s. |
| (6) Sleinkohlen Teer Pech Electrode Pitch 63–73° No. 282/75. | 60–62 | Do. |
| (7) United Coke & Chemical Co. Ltd. Electrode Pitch Ref. No. 33/64. | 80–88 | 20 c.cs. of 1,000 c/s. |
| (8) British Resin Products Ltd., Epok Surface Basin (sample) blend 464/7/5, Grade C, 460. | 77–80 | 10 c.cs. of 100,000 c/s. |
| (9) Batch blend 469/7/5 | 65 | Do. |

With very hard pitches it is found that the temperature in the dropping nozzles has to be a good deal higher than in the examples given previously, and then a higher cooling water temperature is needed to avoid cracking of the pellets.

While the conditions for obtaining more or less spherical pellets have been described, it will be understood that in some instances it may be quite acceptable or indeed advantageous, to form pellets with small tails, or flattened pellets. However, a condition to be avoided is one which sometimes occurs, for example with certain hard pitches, in which a tail is formed that encloses a small bubble. Providing such bubbles are avoided, the final moisture content of pellets with tails or flattened pellets is not significantly different from that of spherical pellets. Adjustments can sometimes be made to make the pellets float instead of sink, which can be preferable if a launder is being used.

What I claim is:

1. A pelletising process for pitch and resin substances, wherein discrete globules of the substance in molten form are produced by vertical free fall in air from a nozzle of a drop-forming head from a pulsating flow of the molten substance under the control of a reciprocating plunger, wherein said falling globules enter, at atmospheric pressure, a body of non-solvent cooling water in which said globules solidify, the vertical free fall distance from the nozzle exit to the cooling water surface being selected according to the substance and its temperature to render each globule substantially spherical by allowing retraction into the globule any tail formed upon leaving the nozzle, but preventing each globule from attaining a free fall speed which causes the globule to flatten significantly upon impact with the water surface, and thereby form substantially spherical hardened pellets.

2. A process according to claim 1, wherein the rate of reciprocation of the plunger is variable to change the drop size and hence the size of the final pellets.

3. A process according to claim 1, wherein the molten substance delivered by the drop-forming head is maintained at a temperature above that at which a thread-like formation issues from the nozzle instead of substantially separate drops.

4. A process according to claim 3, wherein the temperature of the molten substance is kept below that at which the globules flatten significantly upon impact with the cooling water surface.

5. A process according to claim 1, wherein the cooling water is substantially at ambient atmospheric temperature.

6. A process according to claim 1, wherein the cooling water temperature is maintained at a level above that at which the pellets would normally tend to bond together and bonding is prevented by the dispersion of an antibonding additive in the cooling water.

7. A process according to claim 6, wherein the additive comprises a chemically-inert silicone fluid, e.g. a dimethyl silicone.

References Cited
UNITED STATES PATENTS

| | | | |
|---|---|---|---|
| 2,790,201 | 4/1957 | Eilbracht et al. | 264—13 |
| 3,341,087 | 9/1967 | Rosin et al. | 264—13 |

FOREIGN PATENTS

| | | |
|---|---|---|
| 402,611 | 1/1933 | Great Britain. |

ROBERT F. WHITE, Primary Examiner

J. R. HALL, Assistant Examiner